United States Patent
Warner

(10) Patent No.: US 11,079,085 B2
(45) Date of Patent: Aug. 3, 2021

(54) DYNAMIC BENDING LIGHT MODULE

(71) Applicant: Valeo North America, Inc., Troy, MI (US)

(72) Inventor: Gavin Warner, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/042,799

(22) Filed: Jul. 23, 2018

(65) Prior Publication Data
US 2020/0025349 A1     Jan. 23, 2020

(51) Int. Cl.
| | |
|---|---|
| *F21S 41/63* | (2018.01) |
| *F21S 41/141* | (2018.01) |
| *F21S 41/155* | (2018.01) |
| *F21S 41/25* | (2018.01) |
| *F21S 41/26* | (2018.01) |
| *F21Y 115/10* | (2016.01) |

(52) U.S. Cl.
CPC ........... *F21S 41/635* (2018.01); *F21S 41/141* (2018.01); *F21S 41/155* (2018.01); *F21S 41/25* (2018.01); *F21S 41/26* (2018.01); *F21Y 2115/10* (2016.08)

(58) Field of Classification Search
CPC ........ B60Q 1/12–124; F21S 41/65–675; F21S 41/25–26; F21S 41/155
See application file for complete search history.

(56) References Cited

U.S. PATENT DOCUMENTS

| | | | |
|---|---|---|---|
| 2002/0196634 A1* | 12/2002 | Jeannot | B60Q 1/12 362/464 |
| 2004/0184279 A1* | 9/2004 | Molto | B60Q 1/10 362/507 |
| 2005/0018436 A1* | 1/2005 | Leleve | B60Q 1/12 362/464 |
| 2005/0047153 A1 | 3/2005 | Raver | |
| 2006/0002130 A1* | 1/2006 | Albou | F21S 41/26 362/514 |
| 2006/0007697 A1* | 1/2006 | Ackermann | B60Q 1/04 362/520 |
| 2006/0023461 A1* | 2/2006 | Knight | B60Q 1/076 362/466 |
| 2008/0112173 A1* | 5/2008 | Dassanayake | B60Q 1/12 362/466 |
| 2013/0010485 A1* | 1/2013 | Sikkens | B60Q 1/122 362/465 |
| 2015/0124472 A1 | 5/2015 | Wintzer et al. | |
| 2017/0211775 A1* | 7/2017 | Potter | F21S 41/336 |

FOREIGN PATENT DOCUMENTS

| | | |
|---|---|---|
| EP | 0317844 A2 | 5/1989 |
| EP | 2060441 A1 | 5/2005 |
| EP | 2034235 A1 | 3/2009 |

* cited by examiner

*Primary Examiner* — Mariceli Santiago
(74) *Attorney, Agent, or Firm* — Valeo North America, Inc.

(57) ABSTRACT

A lighting module and a headlamp for vehicle lighting are provided. The lighting module includes a dynamic bending light module; and a lens that is situated in operative relationship with the dynamic bending light module; wherein the lens has a thin aspect.

11 Claims, 4 Drawing Sheets

DYNAMIC BENDING LIGHT MODULE

BACKGROUND

The invention relates to the domain of lighting and/or signaling, in particular for a motor vehicle. More specifically, the invention relates to a lighting module for a motor vehicle, as well as a lighting device including such a lighting module.

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions. Numerous studies have found that nighttime visibility is a key to highway safety.

Lighting and/or signaling devices may include one or more lighting modules mounted rotatably about an axis, notably to address the problems of cornering lights. Such rotary modules are particularly suited to performing directional lighting functions, better known as dynamic bending light (DBL), in which the objective is to dynamically illuminate the bend when the vehicle is turning. Since the lighting module is mounted pivotingly about a substantially vertical axis of rotation, the beam projected from the headlamp can be oriented towards the inside of a bend when cornering, instead of along the longitudinal axis of the vehicle.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a lighting module that includes a dynamic bending light module; and a lens that is situated in operative relationship with the dynamic bending light module; wherein the lens has a thin aspect.

In one aspect, the lighting module further includes an alignment module separate from the dynamic bending light module.

In one aspect, the lighting module further includes a drive device configured to rotate the dynamic bending light module.

In one aspect, the drive device is configured the dynamic bending light module with an angle of rotation of ±15 degrees.

In one aspect, the rotation is controlled by a controller coupled to a steering wheel sensor.

In one aspect, the dynamic bending light module is configured to generate a beam pattern having a cut off profile.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
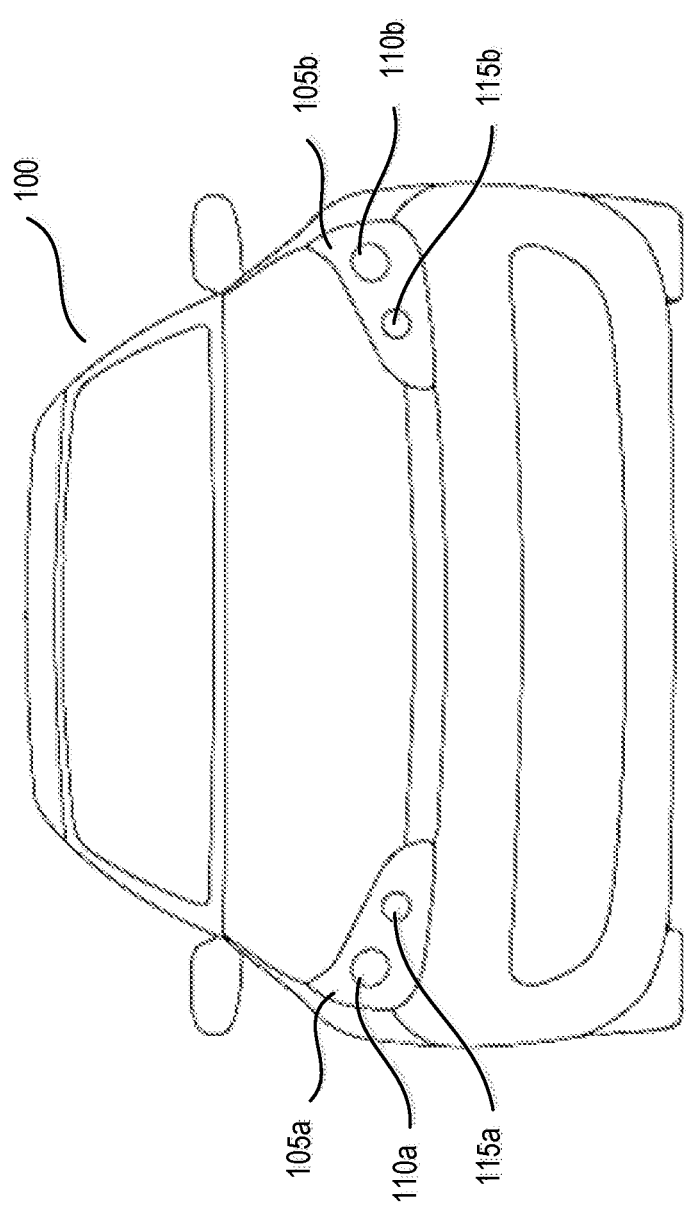
FIG. 1 illustrates a front-end of an exemplary motor vehicle according to one example.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Referring now to the drawings, wherein like reference numerals designate identical or corresponding parts throughout several views, the following description relates to a lighting module for a motor vehicle, as well as a lighting device including such a lighting module. More specifically, the description relates to a thin lens module adapted for adaptive front lighting system.

Conventional thin lens module cannot be adapted for adaptive front lighting system. When the module swivels both the kink and flat swivel.

FIG. 1 illustrates a front-end of an exemplary motor vehicle 100. Motor vehicle 100 includes two headlamp assemblies 105a and 105b. Headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction. In one implementation, the low beam headlamps 110a and 110b may include a thin lens module having a rotatable dynamic bending light (DBL) function.

Figure 2:
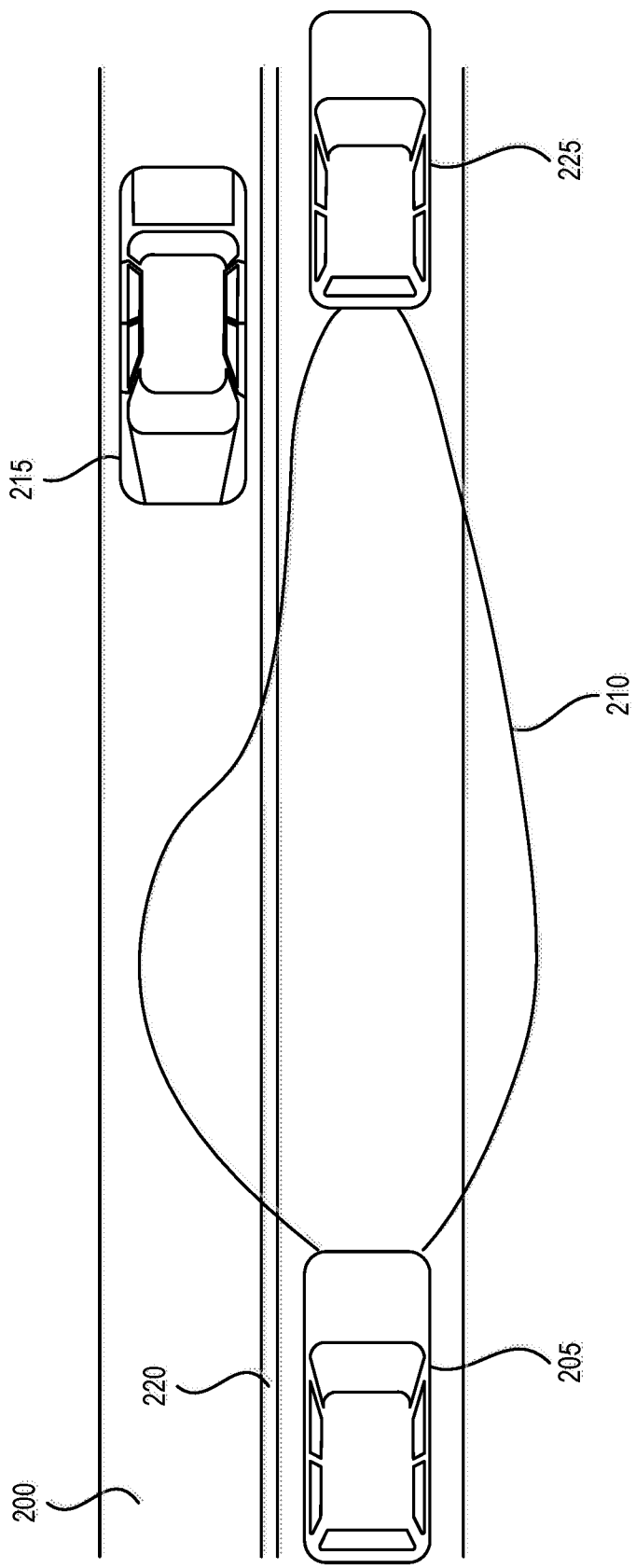
FIG. 2 is a schematic of an exemplary roadway, a motor vehicle, and a light distribution pattern according to one example.

FIG. 2 is a schematic diagram of an exemplary roadway 200, motor vehicle 205, and a light distribution pattern 210 for low beam headlamps of motor vehicle 205. Light distribution pattern 210 for the low beam headlamps of motor vehicle 205 can be optically designed to minimize the amount of light that crosses the centerline 220 of roadway 200 to reduce dazzle (a blinding effect from the headlights) to a driver of an oncoming motor vehicle 215. Additionally, a range of the low beam headlamps of motor vehicle 205 can be limited to reduce dazzle in the rear-view mirror for a driver of motor vehicle 225 directly ahead of motor vehicle 205 driving in the same direction.

Figure 3A:
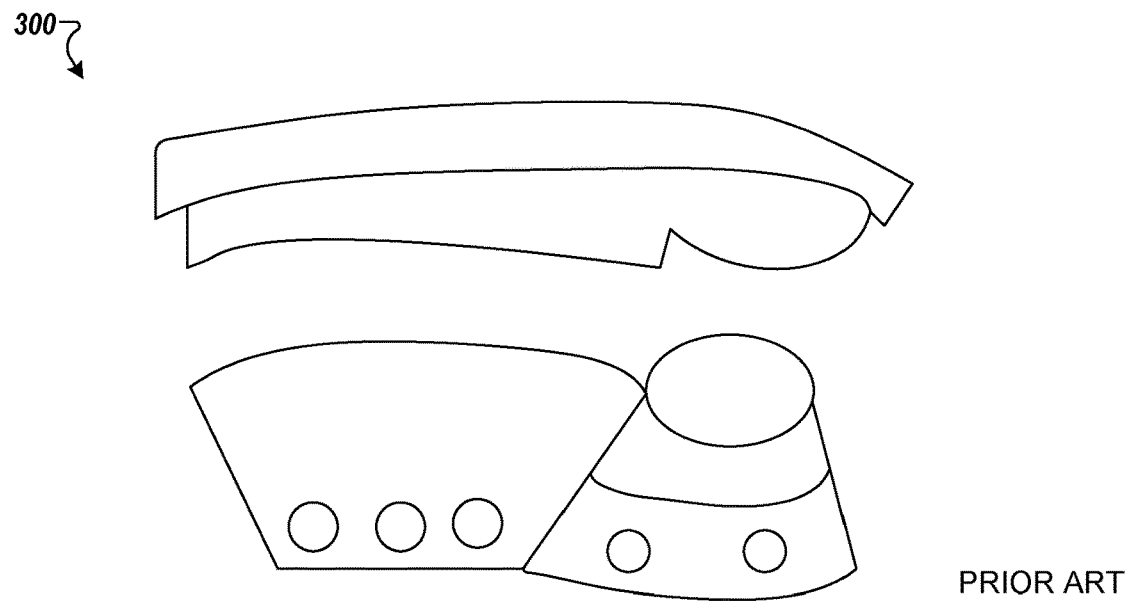
FIG. 3A is a schematic that shows a thin lens module according to one example.

FIG. 3A is a schematic that shows a thin lens module 300 according to one example.

Figure 3B:
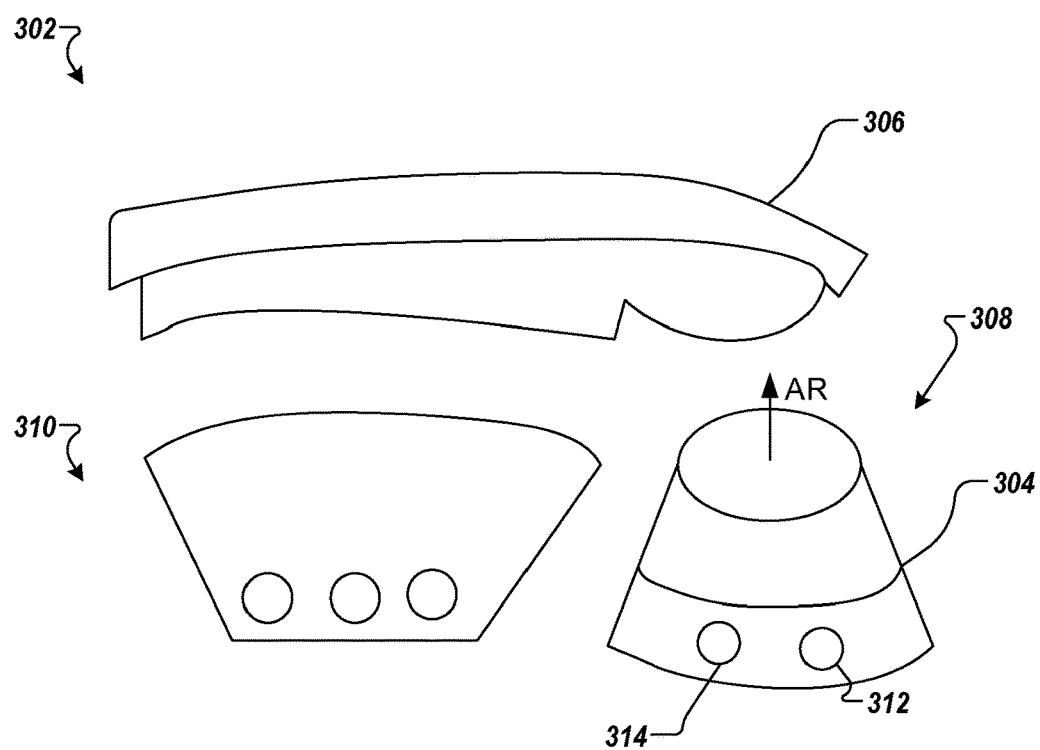
FIG. 3B is a schematic that shows a thin lens module having a rotating light module according to one example.

FIG. 3B is a schematic that shows a thin lens module 302 having a DBL module 304 according to one example. The thin lens module 302 may include an outer lens 306 and an inner lens 308. The inner lens 308 may include an alignment module (or flat module) 310 and the DBL module 304. The alignment module provides light to the spread region of the pattern. The alignment module may include a projection lens. The DBL module 304 is separate from the alignment module 310. The DBL module 304 is configured to rotate about axis of rotation AR. The DBL module may include a projection lens and an LED board. The LED board and the collector lens rotate about the axis of rotation. In one implementation, the angle of rotation is ±15 degrees. The DBL and the alignment module are substantially close to each other. The outer lens 306 is designed not to block light.

The outer lens 306 may have a thin aspect and is generally narrow along its length. The aspect of 307 refers to aspect ratio which is the ratio of height H to width W, or H/W. Thus, a thin aspect ratio 307 refers to a headlight which is tall and narrow. The headlamp 400 provides a beam pattern that conforms to society of automotive engineers (SAE) and/or economic commission for Europe (ECE) standards.

The outer lens 306 may be transparent and may be made from a plastic such as polycarbonate (PC), polymethyl methacrylate, polypropylene, polybutylene terephthalate, or the like. The outer lens 306 may have an outer surface that is adapted or shaped to follow a contour or surface of the vehicle for styling purposes and aerodynamic benefits.

The thin lens module 302 may be included in a housing that includes one or more light modules. The DBL module 304 may include at least one light source. The light source may include at least one LED or an array of LEDs. In one implementation, the light source may include at least one OLED or an array of OLEDs or polymer light emitting diodes (PLEDs) and/or monolithic LEDs. For example, the light source may be an areal/planar luminous field. In one example, the light source may be a laser. The DBL provides a beam pattern having a cut-off profile known by the term "kink" or "elbow". In FIG. 3, the DBL module 304 includes two LED couplers 312 and 314.

The thin lens module 302 may include a drive device coupled to the DBL module 304. The drive device may include an electric motor, for example a step-by-step or stepper motor. The drive device is configured to rotate the DBL module 304 about the axis of rotation AR. The drive device is configured to rotate and then goes back to the original position. The DBL module 304 provides a consistent pattern as the module rotates. The cut off profile or "kink" is designed to provide high performance in the Insurance Institute for Highway Safety (IIHS) tests and ratings.

Figure 4:
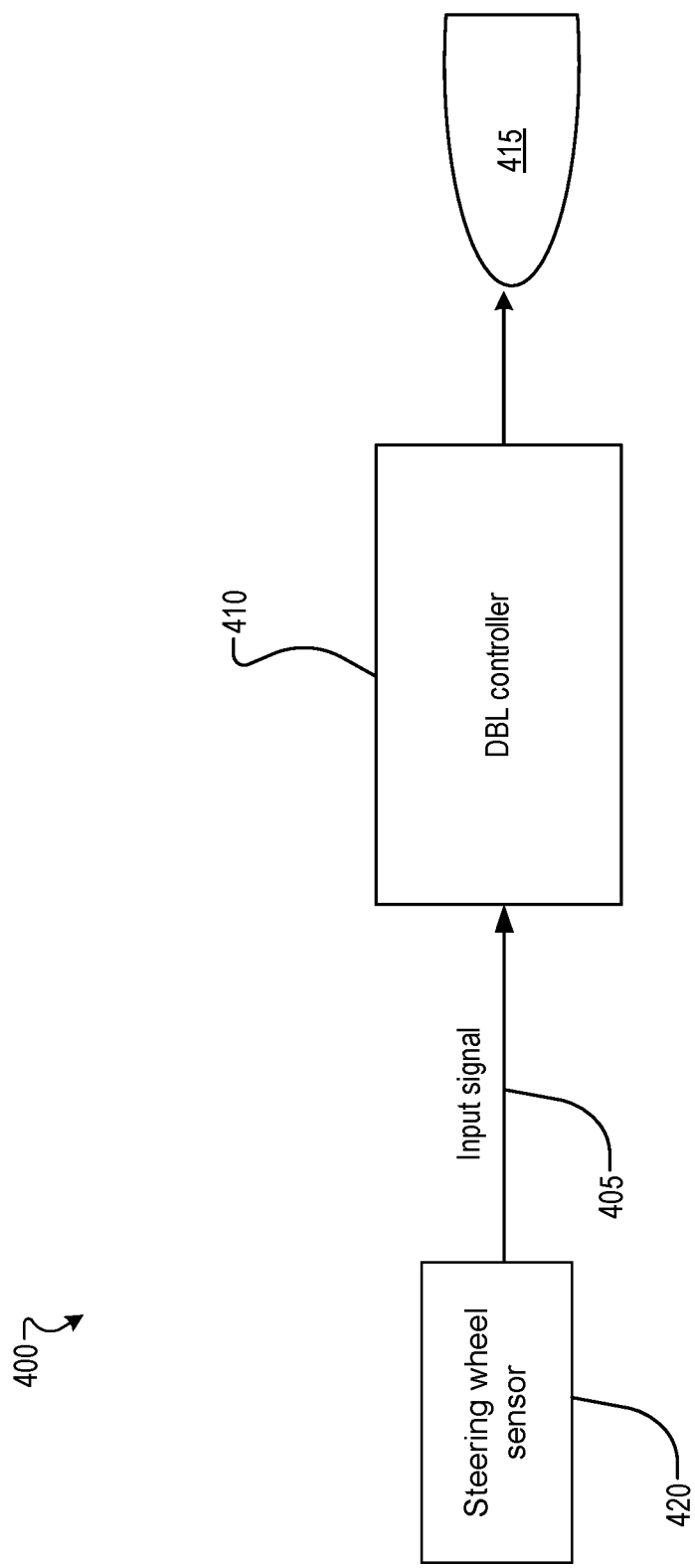
FIG. 4 is a block diagram of a low beam headlamp assembly according to one example.

FIG. 4 is a block diagram of a low beam headlamp assembly 400 according to one example. The low beam headlamp assembly includes a DBL module 415. An input signal 405 is connected to the DBL module controller 410. A single DBL controller 410 can be employed for both a right and left low beam headlamp assembly such that the DBL module 415 are driven in a synchronized manner. The input signal 405 may be generated by a controller based on data from a steering wheel sensor 420 that is sensitive to the trajectory of the vehicle 100. In one implementation, the DBL controller 410 may be coupled to a steering wheel of the vehicle 100. In other implementations, the controller may be coupled to other devices that are sensitive to the trajectory of the vehicle 100. The devices may include a camera or a GPS navigator in addition to or instead of the steering wheel sensor. The controller includes any embedded system, computer, processor, electronic control unit (ECU), or microcontroller of the vehicle 100. In one embodiment, the controller is an ECU dedicated for controlling one or more lighting devices, for example, low beam headlamp assembly 400.

A system which includes the features in the foregoing description provides numerous advantages to users. In particular, embodiments describe herein provide a thin lens module that is adapted to provide DBL function.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A lighting module for a low-beam headlamp comprising:
    a dynamic bending light module configured to generate an elbow or kink from a cut-off profile of a light beam pattern, the dynamic bending light module including a number of organic light emitting diodes (OLEDs) arranged on a LED board and a collector lens;
    an alignment module separate from the dynamic bending light module, the alignment module configured to provide light to the light beam pattern generated by the dynamic bending light module;
    a lens that is situated in operative relationship with the dynamic bending light module and the alignment module;
    wherein the lens has a thin aspect ratio that is generally narrow along a length of the lens and is situated with the low-beam headlamp that is tall and narrow;
    the dynamic bending light module being configured to rotate independently of the alignment module; and
    a drive device configured to perform a rotation of the dynamic bending light module wherein rotation is controlled by a controller device coupled to a steering wheel sensor.

2. The lighting module of claim 1, wherein the drive device is configured to rotate the dynamic bending light module with an angle of rotation of + or −15 degrees.

3. The lighting module of claim 2, wherein the LED board and the collector lens rotates with the dynamic bending light module.

4. The lighting module of claim 1, wherein the dynamic bending light module expands the number of organic light emitting diodes to also includes a number of light emitting diodes, polymer light emitting diodes (PLEDs), laser light sources or some combination therefrom.

5. A low-beam headlamp of a vehicle, said headlamp comprising:
    a lighting module including
    a dynamic bending light module configured to generate an elbow or kink from a cut-off profile of a light beam pattern, the dynamic bending light module including a number of organic light emitting diodes (OLEDs) arranged on a LED board and a collector lens;
an alignment module that is spaced separate from the dynamic bending light module, the alignment module is configured to provide light to the light beam pattern generated by the dynamic bending light module; and
a lens that is situated in operative relationship with the dynamic bending light module and the alignment module;
wherein the lens has a thin aspect ratio that is generally narrow along a length of the lens and is situated with said headlamp that is tall and narrow;
the dynamic bending light module being configured to rotate independently of the alignment module;
where the lighting module further includes a drive device that is configured to rotate the dynamic bending light module and wherein rotation is controlled by a controller device coupled to a steering wheel sensor.

6. The headlamp of claim 5, wherein the drive device is configured to rotate the dynamic bending light module with an angle of rotation of + or −15 degrees.

7. The low-beam headlamp of claim 5, wherein the dynamic bending light module expands the number of organic light emitting diodes to also include a number of light emitting diodes, polymer light emitting diodes (PLEDs), laser light sources or some combination therefrom.

8. A dynamic bending light module of a vehicle's headlamp, the dynamic bending light module comprising:
a collector lens;
a number of organic light emitting diodes (OLEDs), wherein the collector lens and the number of OLEDs are configured to rotate independently of an alignment module of a low-beam headlamp, where rotation is controlled by a controller device coupled to a steering wheel sensor,
where the alignment module provides light to a light beam pattern generated by the dynamic bending light module and is situated in an operative relationship with a lens having a thin aspect ratio that is generally narrow along a length of the lens and is situated with the low-beam headlamp; and
wherein the dynamic bending light module is configured to generate an elbow or kink from a cut-off profile of the light beam pattern.

9. The module of claim 8, further comprising: a drive device coupled to the collector lens and the number of OLEDs.

10. The lighting module of claim 9, wherein the drive device is configured to rotate the dynamic bending light module with an angle of rotation of + or −15 degrees.

11. The dynamic bending light module of claim 8, wherein the dynamic bending light module substitutes the number of organic light emitting diodes to include a number of light emitting diodes, polymer light emitting diodes (PLEDs), laser light sources or some combination thereof.

* * * * *

UNITED STATES PATENT AND TRADEMARK OFFICE
CERTIFICATE OF CORRECTION

PATENT NO. : 11,079,085 B2  
APPLICATION NO. : 16/042799  
DATED : August 3, 2021  
INVENTOR(S) : Gavin Warner Page 1 of 1

It is certified that error appears in the above-identified patent and that said Letters Patent is hereby corrected as shown below:

In the Claims

Column 6, Line 17:  
Replace "The module of claim 8 . . ."  
With:  
--The dynamic bending light module of claim 8 . . .--

Column 6, Line 20:  
Replace "The lighting module of claim 9 . . ."  
With:  
--The dynamic bending light module of claim 9 . . .--

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*